No. 724,827. PATENTED APR. 7, 1903.
A. C. EASTWOOD.
ELECTRIC MOTOR.
APPLICATION FILED JAN. 15, 1903.
NO MODEL.
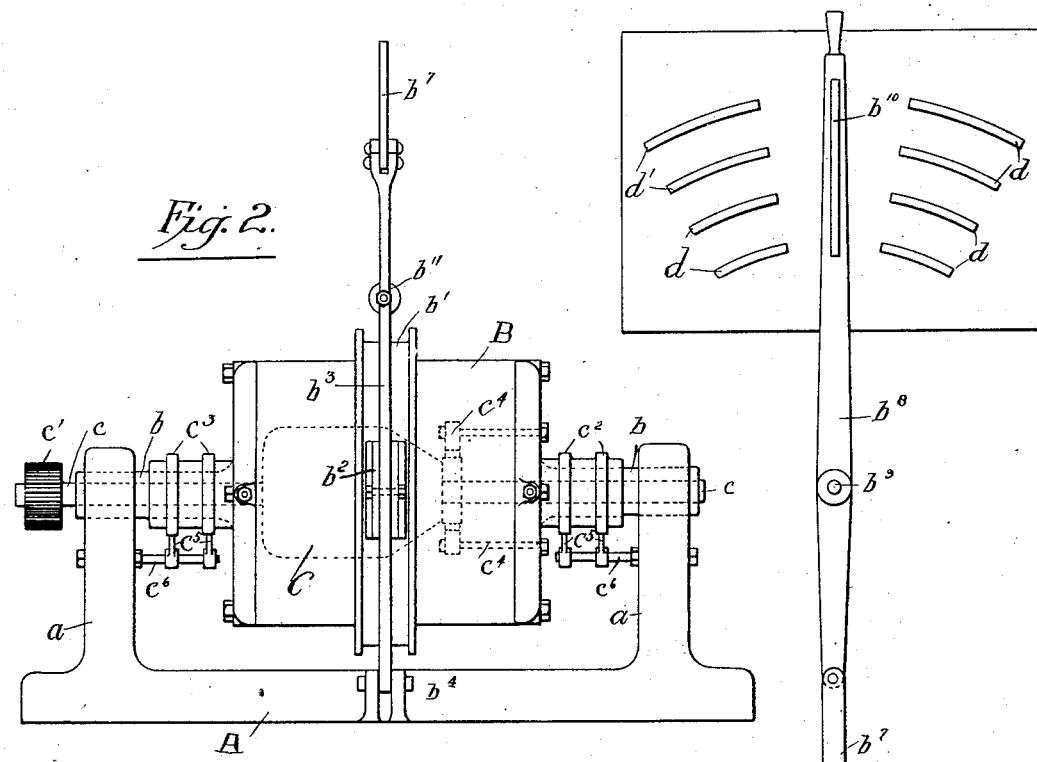
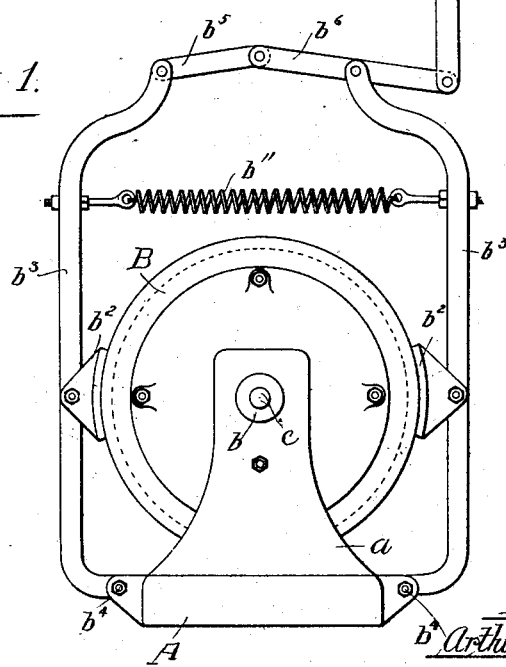
Witnesses:
Titus H. Ions.
Herman E. Metius
Inventor:
Arthur C. Eastwood
by his Attorneys.
Howson & Howson

UNITED STATES PATENT OFFICE.

ARTHUR C. EASTWOOD, OF CLEVELAND, OHIO.

ELECTRIC MOTOR.

SPECIFICATION forming part of Letters Patent No. 724,827, dated April 7, 1903.

Application filed January 15, 1903. Serial No. 139,145. (No model.)

*To all whom it may concern:*

Be it known that I, ARTHUR C. EASTWOOD, a citizen of the United States, and a resident of Cleveland, Ohio, have invented certain Improvements in Electric Motors, of which the following is a specification.

My invention consists of an improved electric motor and apparatus for controlling the same, having for its object the provision of a construction such that it is possible to start and operate the motor at any desired speed without requiring or utilizing resistance.

A further object of the invention is to so construct the motor that it shall be possible to safely and efficiently apply current at full-line voltage directly to it even though said motor be attached to a load, it being further desired to provide a construction possessing the above-noted advantages which shall be applicable to all types of motors regardless of whether they are designed for alternating or direct current work.

The apparatus at present in use for the purpose of controlling direct-current variable-speed motors necessarily includes resistance subdivided into a number of sections, depending upon the number of speeds desired, and is open to the objection that not only is the number of attainable speeds limited by the number of subdivisions of the resistance, but this number can only be increased by excessive complication of parts, and consequently greatly-increased expense. As will be appreciated by those skilled in the art, there is always under operating conditions more or less destructive arcing occurring between the contact elements of the controlling device, in addition to which there is a rapid deterioration of the resistance material, due to the alternate heating and cooling to which it is subjected in regulating the current both in starting and in the operation of the motor. Further, owing to low armature resistance an excessive and frequently injurious rush of current invariably takes place when the motor is started from rest, this being particularly serious when it is endeavored to start the motor under load. The speed of an induction alternating-current motor, on the other hand, is at present controlled either by inserting a transformer in series with the primary of the motor and varying the number of effective turns in said transformer, so as to vary the voltage supplied to the motor, or by inserting a variable resistance in series with the secondary of the motor.

All of the above-mentioned apparatus has, in addition to the objections noted, disadvantageous and inefficient features inherently connected with it, all of which are obviated in my improved electric motor.

The above-noted objects and advantages I attain as hereinafter set forth, reference being had to the accompanying drawings, in which—

Figure 1 is an end elevation of a motor and its controlling mechanism constructed according to my invention; and Fig. 2 is a side elevation of the motor shown in Fig. 1, further illustrating the arrangement of its parts.

In the drawings, A represents the supporting-frame of an electric motor, having at each end an upwardly-projecting standard $a$, provided with bearings for the reception of extensions $b$ from the field frame or body B of the motor, said extensions being in the present instance made tubular for the accommodation of a shaft $c$, upon which is carried the armature C of the motor. (Indicated in dotted lines in Fig. 2.) The field-frame B is thus supported so as to be free to revolve, as is also the armature C, the interior of the tubular extensions $b$ serving as bearings for the armature-shaft, which is provided at one end with a pinion $c'$, whereby any desired form of mechanism may be operated. Said field-frame of the motor is provided with a braking-surface $b'$, upon which bear brake-shoes $b^2$, carried on bars or arms $b^3$, pivoted at $b^4$ to the supporting-frame of the device. Pivoted to the upper ends of the arms $b^3$ are two links $b^5$ and $b^6$, also pivotally connected together, the latter of said links having pivoted to it a third link $b^7$. An operating-arm $b^8$ is pivoted to any suitable support at $b^9$, being connected to the link $b^7$ and having contact-pieces $b^{10}$, placed to coöperate with two sets of contact-segments $d$ and $d'$. Carried by the field-frame B of the motor and suitably insulated therefrom are two sets of metallic rings $c^2$ and $c^3$, certain of these being electrically connected with the field-windings of the motor, while others are connected to brush-holders, shown in dotted lines at $c^4$, whereby current is supplied to the armature C, it being of course understood that this construction may be modified to suit various forms of motors—as, for example, in the case of induction-motors, which require no brushes or commutator.

Brushes $c^5$, suitably insulated from each other and carried upon arms $c^6$, supported from the standards $a$, serve to transmit electric current to the rings $c^2$ and $c^3$, while the contact-pieces $d$ and $d'$ are connected to a source of supply of current and to the contact-brushes $c^5$ in the manner well known to the art, the wiring being so arranged that in the device illustrated current will be delivered to the motor to turn the pinion $c'$ in one direction when the operating-arm $b^8$ is moved so that its contact-pieces $b^{10}$ engage the segments $d'$ and to turn said pinion in an opposite direction when said contacts are moved into engagement with the segments $d$.

In operation as soon as the contact-pieces $b^{10}$ strike the segments $d'$, for example, current is supplied to the motor, and, assuming that a load is connected to whatever mechanism engages the pinion $c'$, the field-frame of the motor will almost instantly begin to revolve, attaining the critical or "no-load" speed of the motor in a relatively very short time. As, however, the operating-arm $c^8$ is moved upon the contact-segments farther away from its vertical position, the system of levers $b^3$, $b^5$, $b^6$, and $b^7$ is brought into action and the braking-shoes $b^2$ are pressed against the braking-surface $b'$ of the motor field-frame, thereby tending to stop its revolution, said action being assisted, if preferred, by means of a spring $b^{11}$, uniting the two bars $b^3$ and tending to always draw them together. Since, however, there must be as long as current is supplied to the motor a certain relative angular difference of speed between the field of the motor and its armature, said armature will now begin to rotate with a velocity depending upon the falling off in the speed of the rotating field-frame, and as the arm $b^8$ is moved farther from its central position and the braking-shoes $b^2$ are made to press more strongly upon the braking-surface the armature will gradually be speeded up until it finally turns at the "full-load" speed of the motor.

It will be seen that by the means above described the starting-current required for the motor is reduced to a minimum far below that possible with the ordinary system of control, in addition to which it will be noted that any desired speed of the armature can be secured simply by varying the speed at which the field-frame is allowed to turn, such variation being secured by changing the position of the operating-arm $b^8$, so as to cause the brake-shoes to bear with more or less force on the braking-surface.

From the above it will be seen that my improved construction is especially adapted for use with alternating-current motors of the synchronous type, for, as it will be understood by those skilled in the art, such motors may be thereby operated in a simple manner so as to secure any desired speed, since as long as the necessary relative speed is maintained between the two reactive elements of the motor (the armature and field) it is immaterial whether the field is rotating or fixed.

It will be understood that all heat produced by friction of the brake-shoes upon the braking-surface $b'$ will be quickly dissipated by the revolution of the field-frame, although this latter may, if desired, be provided with projecting vanes having any desired surface for accelerating such cooling. The braking-face $b'$ is preferably made of chilled iron, while the braking-shoes $b^2$ are of wood, these forming the wearing parts of the device and being cheaply and easily renewed.

It is to be understood that I do not confine myself to the particular arrangement and construction of parts shown, since it is evident that further modifications would be involved, as will be appreciated by those skilled in the art, in adapting various forms of motors for operation according to my invention.

While in the foregoing description I have referred to the armature as being operatively connected to the load and to the field-frame as revolving when current is first supplied to the motor, it is to be understood that it is immaterial whether such arrangement is literally followed or whether the load is attached to the field-frame, so as to leave the armature, with its suitably-designed braking-surface, free to rotate when the current-supply circuit is first closed.

I claim as my invention—

1. In an electric motor, the combination of a frame, two reactive elements supported thereby, one of said elements having tubular extensions journaled in said frame, the second of said elements being carried on a shaft held in said extensions of the first member, with means for retarding to any desired extent the speed of rotation of one of the members, substantially as described.

2. The combination with an electric motor constructed so that it may be started without load, of means for causing said motor to assume a load, with a switch controlling the flow of current to the motor and operated by said means, substantially as described.

3. The combination with an electric motor having a frame and two coactive elements supported thereby so as to be free to rotate, of an operating-arm, means connected thereto constructed to vary the speed of revolution of one of the members when said arm is moved and an electric switch also operated by movement of said arm, substantially as described.

4. The combination in an electric motor, of a frame, two reactive elements supported thereby so as to be free to rotate, means for retarding revolution of one of said elements, an operating-lever having means for causing current to be applied to the motor and constructed to cause operation of said retarding means while permitting said current to flow, substantially as described.

5. The combination in an electric motor, of a frame, two reactive elements supported thereby so as to be free to rotate, a braking-surface on one of said elements, braking means coacting with said surface, an operating-lever having means for causing current to be supplied to the motor, said lever being connected to the braking means, substantially as described.

6. The combination in an electric motor, of a frame, two reactive elements supported thereby so as to be free to rotate, contact-pieces connected to a source of supply and to an electric motor, an operating-arm having means coacting with said contact-pieces for causing current to be supplied to the motor, a brake constructed to retard the revolution of one of the elements of the motor, and means connecting said operating-arm with the brake, substantially as described.

7. The combination with an electric motor having two rotatable reactive elements, of two series of contact-pieces connected to a source of current-supply and to said motor, an operating-lever having means constructed to coact with said series of contact-pieces, and a brake acting upon one of the elements of the electric motor, having means connecting it to the operating-lever whereby it is applied by motion of the operating-lever irrespective of the particular series of contact-pieces in service, substantially as described.

8. An electric motor having two reactive elements of which one is provided with a braking-surface, a lever pivoted to the frame of the motor and carrying a shoe for engagement with said surface, a switch for supplying current to the motor, and means connecting the switch to the lever whereby the shoe is caused to bear upon the braking-surface simultaneously with the closing of the switch, substantially as described.

9. An electric motor having rotative reacting elements, levers pivoted to the frame having braking-shoes constructed to bear upon one of the elements, means connecting said levers, a switch, including an operating-arm, for supplying current to the motor and means for connecting said levers to said operating-arm, substantially as described.

10. An electric motor having two rotative elements, a brake for retarding the rotation of one of said elements, an operating-arm for actuating said brake, a contact-piece carried by said arm, and contact-segments electrically connected to the motor constructed to permit motion of the arm without breaking the motor-circuit, whereby the brake may be applied to the rotating element to any desired extent without interrupting the flow of current of the motor, substantially as described.

In testimony whereof I have signed my name to this specification in the presence of two subscribing witnesses.

ARTHUR C. EASTWOOD.

Witnesses:
C. W. COMSTOCK,
J. E. WELLMAN.